Patented July 14, 1931

1,814,493

UNITED STATES PATENT OFFICE

ADOLF PFANNENSTIEL, OF BERLIN-TEMPELHOF, AND HANS KAUTSKY, OF BERLIN-CHARLOTTENBURG, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

CATALYST FOR CHEMICAL REACTIONS

No Drawing.   Application filed November 17, 1927. Serial No. 234,033.

The invention is based on the discovery that finely subdivided metals which have been precipitated at a low or moderate temperature, that is to say below 100° C., from solutions of their salts by reduction with silicon-oxygen compounds of a lower stage of oxidation than $SiO_2$, such as siloxene (oxydisilin) (compare Chemical Abstracts, vol. 19, I, 1925, page 19; H. Kautsky, Zeitschrift für anorganische und allgemeine Chemie, 117, page 209–242, of 1921, and Zeitschrift für Physik, 9 page 267) have a particularly high catalytic efficacy which renders them very suitable for bringing about various reactions.

The precipitates obtained in the indicated manner consist of a porous silica which contains finely subdivided metals not only on their surface but in their whole structure. The preparation of these precipitates may be executed in the presence of a material adapted to serve as a carrier for the precipitate.

If, e. g., salts of nickel, zinc, copper, palladium or platinum or mixtures of such salts are treated in the mentioned manner highly active catalysts are thus obtained which are suitable for bringing about difficult hydrogenations among others nucleal hydrogenations, even at ordinary temperature. When using silver- or copper-catalysts, which can be prepared in like manner, alcohols e. g. can be transformed at 230° C. smoothly and in a very good yield into the corresponding aldehydes according to the process of Sabatier and Senderens (see Chemisches Zentralblatt 1903, Vol. I, pages 955 and 1118; Annales de Chimie et de Physique 9 Vol. 13, page 277). For reductions there come also into consideration, gold, tin, cobalt lead, thallium and bismuth whereas for oxidations osmium- and iridium-catalysts prepared in the above-indicated manner can be used.

The following examples illustrate, without limiting the invention, the preparation and efficacy of the new catalysts; the parts are by weight:

*Example 1.*—To siloxene prepared from 100 parts of calcium silicid a solution is given made by dissolving 114 parts of crystallized nickel-sulfate ($NiSO_4+7H_2O$) in 800 parts of water, the reaction being tempered by throwing ice pieces into the solution. The acid liberated by the reaction is neutralized by a basic compound, for example by magnesium- or calcium-carbonate. The reaction product is first yellow-green, it becomes then gray and finally black. When the development of gas has diminished the mass is slowly warmed at 80° C. The precipitate is filtered off and washed with cold water until it is free from salts. It may be employed as catalyst in the wet state or after being dried.

*Example 2.*—One pours over siloxene prepared from 10 parts of calcium silicid a solution of 80 parts of nickel-acetate in 600 parts of water and adds 35 parts of magnesium-carbonate. Hydrogen evolves quickly and the temperature spontaneously raises at about 80° C. It is not necessary to cool. The nickel is completely precipitated. When no more gas is developed the precipitate is freed from the lye by filtration and washed with cold water. The catalyst obtained may be employed in the wet or dry state.

*Example 3.*—In the Example 2 there are employed instead of 35 parts of magnesium-carbonate 100 parts of the same compound, the excess serving as carrier for the precipitate being formed by the reaction and consisting of porous silica containing nickel.

*Example 4.*—100 parts by weight of nitrobenzene are heated, while stirring, to 60–80° C. under 30–40 atmospheres of hydrogen pressure together with 60 parts of water and the catalyst prepared as above indicated containing 4 parts of nickel. Thus aniline is obtained in a good yield.

*Example 5.*—100 parts by weight of 1-nitronaphthalene are stirred for a prolonged time at 80–100° C. and under about 40 atmospheres pressure of hydrogen together with 80 parts of alcohol and a catalyst prepared in the manner above indicated containing 3 parts of copper. The solution of 1-aminonaphthalene in alcohol thus obtained is freed from the catalyst which can be used again. The aminonaphthalene is separated from this solution in the usual manner.

Nitrophenols, nitrophenol ethers, such as for instance nitrocresol methyl ether, nitroarylamines, azobenzene or the like, can be reduced to the corresponding amines quite similarly with like result.

*Example 6.*—420 parts of crotonaldehyde boiling at 103–105° C. are heated in an autoclave, while stirring, to 70–80° C. under a pressure of hydrogen together with 400 parts of water and a catalyst of the above-indicated kind corresponding to 12 parts of nickel. Hydrogen is vigorously absorbed to an extent corresponding with the quantity calculated for the formation of butyraldehyde. By separating from the mass the catalyst and water, n-butyraldehyde is obtained boiling at 73–75° C. The yield amounts to 90–95 per cent of the theory.

Seen under the microscope the catalysts obtained consist of Lamellæ containing in their entire structure the finely subdivided metal.

The quantities of nickel and water used may be varied within wide limits, as well as the temperature; even at the temperature of 100° C. there is still no butyl-alcohol formed.

*Example 7.*—400 parts of cinnamic aldehyde, 100 parts of water, 160 parts of benzene and a catalyst of the above-described kind corresponding to 12 parts of nickel are stirred together under a pressure of hydrogen. At 70–90° C. the reaction occupies 4–5 hours. There are thus obtained hydrocinnamic aldehyde in a yield of 76–77 per cent of the theory and phenylpropyl alcohol in a yield of 3–4 per cent of the theory.

*Example 8.*—Citronellal is treated with hydrogen at 80–100° C. in the presence of 3 per cent of nickel in the form of a catalyst of the above-indicated kind. The yield of citronellol thus obtained amounts to 60–70 per cent of the theory, according to the quality of the commercial citronellal used.

*Example 9.*—A solution of ββ-dimethylacrylic acid in benzene is hydrogenated at 90–110° C. in the presence of 10 per cent of nickel in the form of a catalyst of the above-described kind. Isovalerianic acid is thus obtained in a satisfactory yield.

Instead of hydrogenating the free dimethylacrylic acid it is possible to convert in an analogous manner with the mentioned catalyst into the corresponding compounds of the isovalerianic acid the sodium salt of dimethylacrylic acid in an equeous solution at 70–90° C., or an ester of the acid for instance the ethyl ester, as such, or in a solvent, at 70° C.

*Example 10.*—Oleic acid ester is hydrogenated under pressure for 2–2½ hours at 100–110° C. in the presence of 1 per cent nickel in the form of a catalyst of the above-mentioned kind, until the iodine number has diminished from 38 to 0.2. Stearic acid ester is thus formed in a good yield. The catalyst may be used repeatedly.

*Example 11.*—100 parts of 2-oxo-pentene-3 under pressure of hydrogen while stirring are heated at 70–80° C. in the presence of 3 parts of nickel in the form of a catalyst of the above-mentioned kind. The hydrogen is vigorously absorbed in the theoretical quantity. In the way of destillation with a very good yield 2-oxo-pentane boiling at 101–103° C. is obtained.

If in the foregoing example the temperature is raised to 110–120° C. more hydrogen is absorbed and 2-hydroxy-pentane boiling at 118–120° C. is formed.

In an analogous manner by using a catalyst of the mentioned kind other unsaturated ketones may be hydrogenated. One obtains for example from 2-oxo-hexene-3: 2-oxo-hexane boiling at 128–130° C. and 2-hydroxy-hexane boiling at 138–140° C.; from 2-oxo-4-methyl-pentene-3: 2-oxo-4-methyl-pentane boiling at 116–118° C. and 2-hydroxy-4-methyl-pentane boiling at 127–129° C.; from 2-oxo-heptene-3: 2-oxo-heptane boiling at 45–50° C. under a pressure of 10–12 mm. and 2-hydroxy-heptane boiling at 157° C.; from 2-oxo-5-methyl-hexene-3: 2-oxo-5-methyl-hexane boiling at 55° C. under a pressure at 20 mm. and 2-hydroxy-5-methyl-hexane boiling at 63° C. under a pressure of 20 mm.; from 2-oxo-dekene-3: 2-oxo-dekane boiling at 89–91° C. under a pressure of 9–10 mm.; from 2-oxo-6-methyl-heptene-3: 2-oxo-6-methyl-heptane boiling at 53–56° C. under a pressure of 10–11 mm.; from 6-oxo-undekene-7: 6-oxo-undekane boiling at 104–105° C. under a pressure of 10 mm.; from 2-oxo-hepta-diene-3.5: 2-oxo-heptane boiling at 45–50° C. under a pressure of 10–12 mm.; from 1-phenyl-1-oxo-hexene-2: 1-phenyl-1-oxo-hexane boiling at 128–129° C. under a pressure of 9 mm.; from 1-oxo-Δ-2.7-butenyl-cyclohexane: 1-oxo-2-butyl-cyclohexane, a colorless liquid boiling at 95° C. under a pressure of 10 mm.

What we claim is:

1. The method of producing a catalyst for chemical reactions which comprises precipitating a metal from a solution of a salt thereof by means of a silicon-oxygen compound of a lower oxidation stage than silica.

2. The method of producing a catalyst for chemical reactions which comprises precipitating at a temperature below 100° C. a metal from a solution of a salt thereof by means of a silicon-oxygen compound of a lower oxidation stage than silica.

3. The method of producing a catalyst for chemical reactions which comprises precipitating a metal from a solution of a salt thereof by means of siloxene.

4. The method of producing a catalyst for chemical reactions which comprises precipitating in the presence of a carrier a metal from a solution of a salt thereof by means of a silicon-oxygen compound of a lower oxidation stage than silica.

5. The method of producing a nickel catalyst for chemical reactions which comprises precipitating nickel from a nickel salt solution by means of a silicon-oxygen compound of a lower oxidation stage than silica.

6. The method of producing a nickel catalyst for chemical reactions which comprises precipitating nickel from a nickel salt solution by means of siloxene.

In testimony whereof, we affix our signatures.

ADOLF PFANNENSTIEL.
HANS KAUTSKY.

from a solution of a salt thereof by means of a silicon-oxygen compound of a lower oxidation stage than silica.

5. The method of producing a nickel catalyst for chemical reactions which comprises precipitating nickel from a nickel salt solution by means of a silicon-oxygen compound of a lower oxidation stage than silica.

6. The method of producing a nickel catalyst for chemical reactions which comprises precipitating nickel from a nickel salt solution by means of siloxene.

In testimony whereof, we affix our signatures.

ADOLF PFANNENSTIEL.
HANS KAUTSKY.

CERTIFICATE OF CORRECTION.

Patent No. 1,814,493.   Granted July 14, 1931, to

ADOLF PFANNENSTIEL ET AL.

It is hereby certified that error appears in the printed specification of the above numbered patent requiring correction as follows: Page 1, after line 77, insert the paragraph "Seen under the microscope the catalysts obtained consist of Lamellae containing in their entire structure the finely subdivided metal."; page 2, lines 21 to 24, strike out "Seen under the microscope the catalysts obtained consist of Lamellae containing in their entire structure the finely subdivided metal."; and that the said Letters Patent should be read with these corrections therein that the same may conform to the record of the case in the Patent Office.

Signed and sealed this 29th day of September, A. D. 1931.

(Seal)

M. J. Moore,
Acting Commissioner of Patents.

CERTIFICATE OF CORRECTION.

Patent No. 1,814,493.                    Granted July 14, 1931, to

ADOLF PFANNENSTIEL ET AL.

It is hereby certified that error appears in the printed specification of the above numbered patent requiring correction as follows: Page 1, after line 77, insert the paragraph "Seen under the microscope the catalysts obtained consist of Lamellae containing in their entire structure the finely subdivided metal."; page 2, lines 21 to 24, strike out "Seen under the microscope the catalysts obtained consist of Lamellae containing in their entire structure the finely subdivided metal."; and that the said Letters Patent should be read with these corrections therein that the same may conform to the record of the case in the Patent Office.

Signed and sealed this 29th day of September, A. D. 1931.

(Seal)                                                            M. J. Moore,
                                                                  Acting Commissioner of Patents.